US012347375B2

(12) United States Patent
Jeong et al.

(10) Patent No.: US 12,347,375 B2
(45) Date of Patent: Jul. 1, 2025

(54) PIXEL CIRCUIT AND DISPLAY DEVICE INCLUDING THE SAME

(71) Applicant: Samsung Display Co., LTD., Yongin-si (KR)

(72) Inventors: Minjae Jeong, Yongin-si (KR); Bon-Yong Koo, Yongin-si (KR); Taegyun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/402,189

(22) Filed: Jan. 2, 2024

(65) Prior Publication Data

US 2024/0274077 A1 Aug. 15, 2024

(30) Foreign Application Priority Data

Feb. 15, 2023 (KR) ........................ 10-2023-0020225

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/06* (2013.01); *G09G 2310/08* (2013.01); *G09G 2320/045* (2013.01)

(58) Field of Classification Search
CPC ......... G09G 3/3233; G09G 2300/0819; G09G 2300/0852; G09G 2300/0861; G09G 2310/06; G09G 2310/08; G09G 2320/045
See application file for complete search history.

(56) References Cited

U.S. PATENT DOCUMENTS

| | | | | |
|---|---|---|---|---|
| 2019/0371231 | A1* | 12/2019 | Kim | G09G 3/32 |
| 2021/0210002 | A1* | 7/2021 | Kim | G09G 3/32 |
| 2022/0101783 | A1* | 3/2022 | Han | G09G 3/32 |
| 2023/0039449 | A1* | 2/2023 | Kim | G09G 3/2014 |

FOREIGN PATENT DOCUMENTS

| | | |
|---|---|---|
| CN | 114566115 | 5/2022 |
| KR | 10-2019-0136882 | 12/2019 |
| KR | 10-2021-0131852 | 11/2021 |

* cited by examiner

*Primary Examiner* — Ke Xiao
*Assistant Examiner* — Jennifer L Zubajlo
(74) *Attorney, Agent, or Firm* — KILE PARK REED & HOUTTEMAN PLLC

(57) ABSTRACT

A pixel circuit and a display device including the pixel circuit compensates for a threshold voltage of a first driving transistor using an internal compensation circuit and senses a second driving current of a second driving transistor through sensing transistor using an external compensation circuit to compensate for threshold voltages and mobility of the first and second driving transistor.

21 Claims, 12 Drawing Sheets

PIXEL CIRCUIT AND DISPLAY DEVICE INCLUDING THE SAME

This application claims priority to and benefits of Korean Patent Application No. 10-2023-0020225 under 35 USC § 119, filed on Feb. 15, 2023, in the Korean Intellectual Property Office (KIPO), the entire contents of which are incorporated by reference herein.

BACKGROUND

1. Technical Field

Embodiments of the disclosure relate to a pixel circuit and a display device including the same which are applied to various electronic devices.

2. Description of the Related Art

Generally, a display device includes a display panel and a display panel driver. The display panel includes gate lines, data lines, emission lines and pixel circuits. The display panel driver includes a gate driver for providing gate signals to the gate lines, a data driver for providing data voltages to the data lines, an emission driver for providing emission signals to the emission lines, and a driving controller for controlling the gate driver, the data driver, and the emission driver.

In a display device, a difference in characteristics such as a threshold voltage and mobility of a driving transistor may occur due to a process variation or the like. An internal compensation circuit may compensate for the threshold voltage of the driving transistor by controlling a voltage of a gate terminal of the driving transistor. However, the internal compensation circuit may not compensate the mobility of the driving transistor by sensing a driving current of the driving transistor.

SUMMARY

Embodiments of the disclosure provide a pixel circuit for compensating for a threshold voltage of a first driving transistor using an internal compensation circuit and for sensing a second driving current of a second driving transistor using an external compensation circuit to compensate for threshold voltages and mobility of the first and second driving transistor.

Embodiments of the disclosure provide a display device including the pixel circuit.

In an embodiment of the disclosure, a pixel circuit may include a light emitting element, a write transistor that applies a data voltage to a first electrode of a first driving transistor in response to a first gate signal, the first driving transistor that transmits a first driving current determined based on the data voltage to a gate electrode of a second driving transistor, a compensation transistor that diode-connects the first driving transistor in response to the first gate signal, the second driving transistor that transmits a second driving current determined based on the first driving current to the light emitting element, a first initialization transistor that applies a first initialization voltage to a gate electrode of the first driving transistor in response to a second gate signal, a second initialization transistor that applies a second initialization voltage to the gate electrode of the second driving transistor in response to the first gate signal, a sensing transistor that receives the second driving current in response to a third gate signal, a first capacitor including a first electrode receiving a sweep voltage and a second electrode connected to the gate electrode of the first driving transistor, and a second capacitor including a first electrode receiving a first power voltage and a second electrode connected to the gate electrode of the second driving transistor.

In an embodiment, the sweep voltage may have a waveform which gradually decreases to be at an inactive level, and the first driving transistor may apply the first power voltage to the gate electrode of the second driving transistor in case that the sweep voltage is at the inactive level.

In an embodiment, the second driving transistor may turn off in case that the first driving transistor applies the first power voltage to the gate electrode of the second driving transistor.

In an embodiment, the sensing transistor may apply a third initialization voltage to an anode electrode of the light emitting element in response to the third gate signal.

In an embodiment, the pixel circuit may further comprise a first emission transistor that applies the first power voltage to the first electrode of the first driving transistor in response to a first emission signal, and a second emission transistor that connects the first driving transistor and the second driving transistor in response to the first emission signal.

In an embodiment, the pixel circuit may further comprise a third emission transistor that applies the first power voltage to a first electrode of the second driving transistor in response to a second emission signal.

In an embodiment, the compensation transistor, the first initialization transistor, and the second driving transistor may be of a same type.

In an embodiment, the compensation transistor, the first initialization transistor, and the second driving transistor may be a P-type transistor.

In an embodiment of the disclosure, a pixel circuit may include a light emitting element, a write transistor that applies a data voltage to a first electrode of a first driving transistor in response to a first gate signal, the first driving transistor that transmits a first driving current determined based on the data voltage to a gate electrode of a third emission transistor, a compensation transistor that diode-connects the first driving transistor in response to a fourth gate signal, a first initialization transistor that applies a first initialization voltage to a gate electrode of the first driving transistor in response to a second gate signal, a second initialization transistor that applies a second initialization voltage to the gate electrode of a second driving transistor in response to the first gate signal, the second driving transistor that transmits a second driving current determined based on a voltage of a second electrode of the second initiation transistor to the light emitting element, a sensing transistor that receives the second driving current in response to a third gate signal, a first capacitor including a first electrode receiving a sweep voltage and a second electrode connected to the gate electrode of the first driving transistor, and a second capacitor including a first electrode connected to the gate electrode of the second driving transistor and a second electrode connected to a second electrode of the second driving transistor.

In an embodiment, the sweep voltage may have a waveform which gradually decreases to be at an inactive level, and the first driving transistor may apply a first power voltage to the gate electrode of the third emission transistor in case that the sweep voltage is at the inactive level.

In an embodiment, the third emission transistor may turn off in case that the first driving transistor applies the first power voltage to the gate electrode of the third emission transistor.

In an embodiment, the sensing transistor may apply a third initialization voltage to an anode electrode of the light emitting element in response to the third gate signal.

In an embodiment, the pixel circuit may further comprise a first emission transistor that applies a first power voltage to the first electrode of the first driving transistor in response to a first emission signal, and a second emission transistor that connects the first driving transistor and the second driving transistor in response to the first emission signal.

In an embodiment, the compensation transistor, the first initialization transistor, and the second driving transistor may be of a same type.

In an embodiment, the compensation transistor, the first initialization transistor, and the second driving transistor may be an N-type transistor.

In an embodiment of the disclosure, a display device may include a display panel including a pixel circuit and a display panel driver that drives the display panel. The pixel circuit comprises a light emitting element, a write transistor that applies a data voltage to a first electrode of a first driving transistor in response to a first gate signal, the first driving transistor that transmits a first driving current determined based on the data voltage to a gate electrode of a second driving transistor, a compensation transistor that diode-connects the first driving transistor in response to the first gate signal, the second driving transistor that transmits a second driving current determined based on the first driving current to the light emitting element, a first initialization transistor that applies a first initialization voltage to a gate electrode of the first driving transistor in response to a second gate signal, a second initialization transistor that applies a second initialization voltage to the gate electrode of the second driving transistor in response to the first gate signal, a sensing transistor that receives the second driving current in response to a third gate signal, a first capacitor including a first electrode receiving a sweep voltage and a second electrode connected to the gate electrode of the first driving transistor, and a second capacitor including a first electrode receiving a first power voltage and a second electrode connected to the gate electrode of the second driving transistor.

In an embodiment, the sweep voltage may have a waveform which gradually decreases to be at an inactive level, and the first driving transistor may apply the first power voltage to the gate electrode of the second driving transistor in case that the sweep voltage is at the inactive level.

In an embodiment, the second driving transistor may turn off in case that the first driving transistor applies the first power voltage to the gate electrode of the second driving transistor.

In an embodiment, the sensing transistor may apply a third initialization voltage to an anode electrode of the light emitting element in response to the third gate signal.

In an embodiment, the pixel circuit may further comprise a first emission transistor that applies the first power voltage to the first electrode of the first driving transistor in response to a first emission signal, and a second emission transistor that connects the first driving transistor and the second driving transistor in response to the first emission signal.

According to the pixel circuit and the display device including the pixel circuit according to the embodiments, the pixel circuit and the display device may compensate for the threshold voltage of the first driving transistor using the internal compensation circuit and sense the second driving current of the second driving transistor through the sensing transistor using the external compensation circuit to compensate for the threshold voltages and the mobility of the first and second driving transistor.

BRIEF DESCRIPTION OF THE DRAWINGS

The above and other features of embodiments of the disclosure will become more apparent by describing in detailed embodiments thereof with reference to the accompanying drawings, in which.

DETAILED DESCRIPTION OF THE EMBODIMENTS

Figure 1:
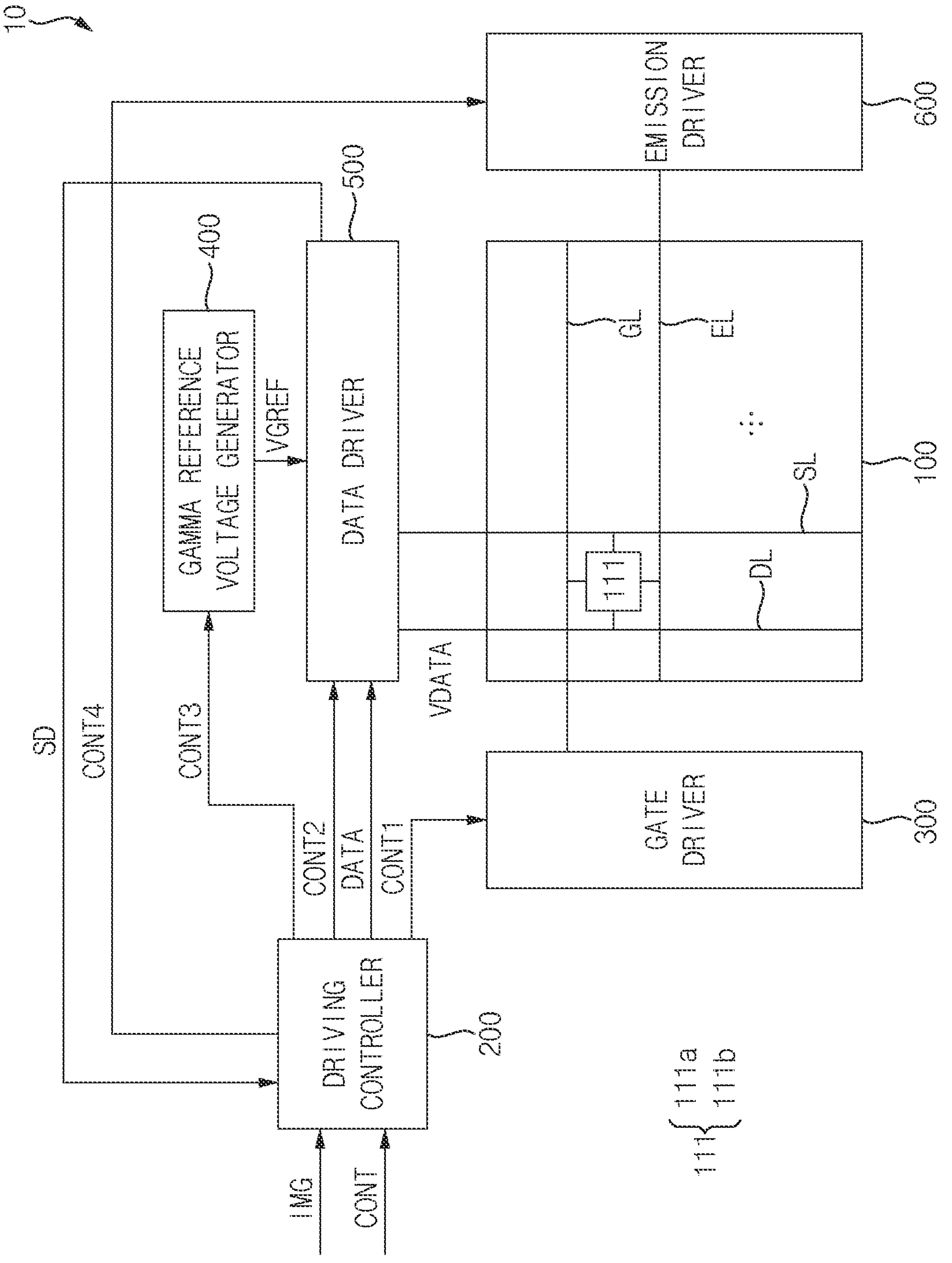
FIG. 1 is a schematic block diagram for illustrating a display device according to embodiments of the disclosure.

Hereinafter, embodiments of the disclosure will be described in detail with reference to the accompanying drawings.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic block diagram for illustrating a display device according to embodiments of the disclosure.

Referring to FIG. 1, a display device 10 may include a display panel 100 and a display panel driver. The display panel driver may include a driving controller 200, a gate driver 300, a gamma reference voltage generator 400, a data driver 500, and an emission driver 600.

For example, the driving controller 200 and the data driver 500 may be integral with each other. For example, the driving controller 200, the gamma reference voltage generator 400, and the data driver 500 may be integral with each other. For example, the driving controller 200, the gate driver 300, and the gamma reference voltage generator 400, and the data driver 500 may be integral with each other. For example, the driving controller 200, the gate driver 300, and the gamma reference voltage generator 400, the data driver 500, and the emission driver 600 may be integral with each other. A driving module including at least the driving controller 200 and the data driver 500 which are integral with each other may be referred to as a timing controller embedded data driver (TED).

The display panel 100 may include a display region displaying an image and a peripheral region disposed adjacent to the display region.

For example, the display panel 100 may be an organic light emitting diode display panel including organic light emitting diodes. For example, the display panel 100 may be a quantum-dot organic light emitting diode display panel including organic light emitting diodes and quantum-dot color filters. For example, the display panel 100 may be a quantum-dot nano light emitting diode display panel including nano light emitting diodes and quantum-dot color filters.

The display panel 100 may include gate lines GL, data lines DL, emission lines EL, and pixel circuits 111 electrically connected to the gate lines GL, the data lines DL, and the emission lines EL.

The driving controller 200 may receive input image data IMG and an input control signal CONT from an external device. For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated in the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200. The data driver 500 may convert the data signal DATA into a data voltage in analog form. The data driver 500 may output the data voltage to the data line DL.

The data driver 500 may sense the pixel circuit 111 to generate sensing data SD. For example, threshold voltages and mobility or the like of a first driving transistor and a second driving transistor included in the pixel circuit 111 may be sensed. The data driver 500 may output the sensing data SD to the driving controller 200. The driving controller 200 may compensate for the input image data IMG based on the sensing data SD. The data driver 500 may generate the data voltage VDATA based on the compensated input image data IMG. The data driver 500 may output the data voltage VDATA to the data lines DL.

The emission driver 600 may generate emission signals for driving the pixel circuit 111 in response to the fourth control signal CONT4 received from the driving controller 200. The emission driver 600 may output the emission signals to the emission lines EL.

FIG. 1 illustrates that the gate driver 300 is disposed on a first side of the display panel 100 and the emission driver 600 is disposed on a second side of the display panel 100 for convenience of description, but the disclosure is not limited to this. For example, both the gate driver 300 and the emission driver 600 may be disposed on the first side of the display panel 100. For example, the gate driver 300 and the emission driver 600 may be integral with each other.

Figure 2A:
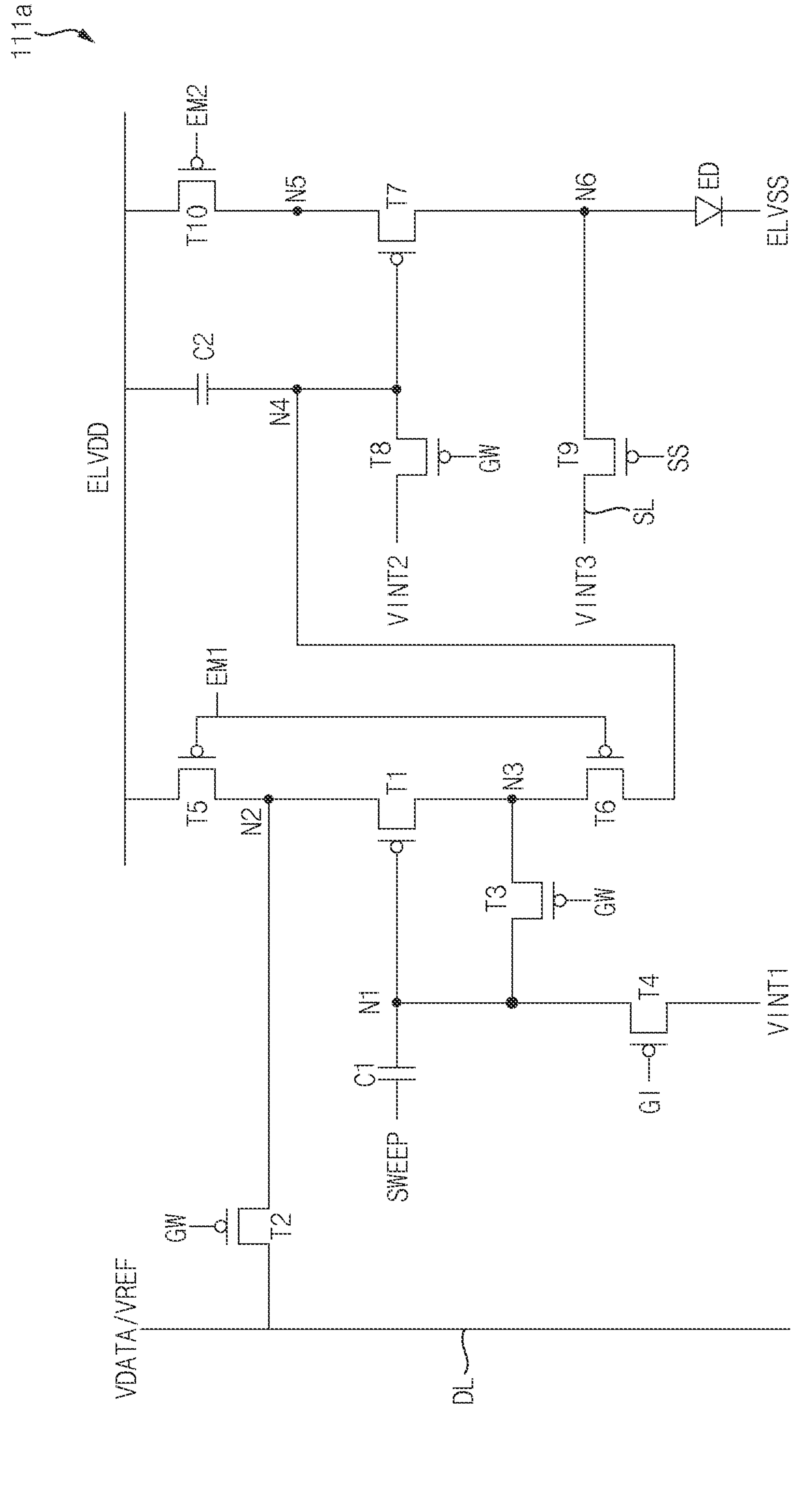
FIG. 2A is a schematic diagram of an equivalent circuit of a pixel circuit included in a display device of FIG. 1 according to embodiments of the disclosure.
Figure 2B:
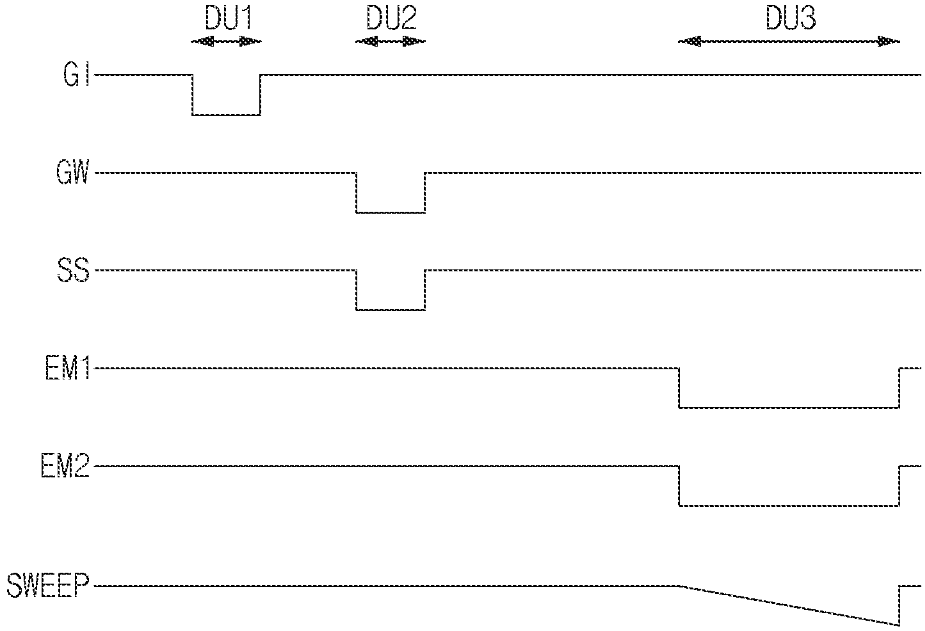
FIG. 2B is a schematic timing diagram for illustrating first to third gate signals, a first emission signal, a second emission signal, and a sweep voltage, which are applied to a pixel circuit of FIG. 2A.
Figure 2C:
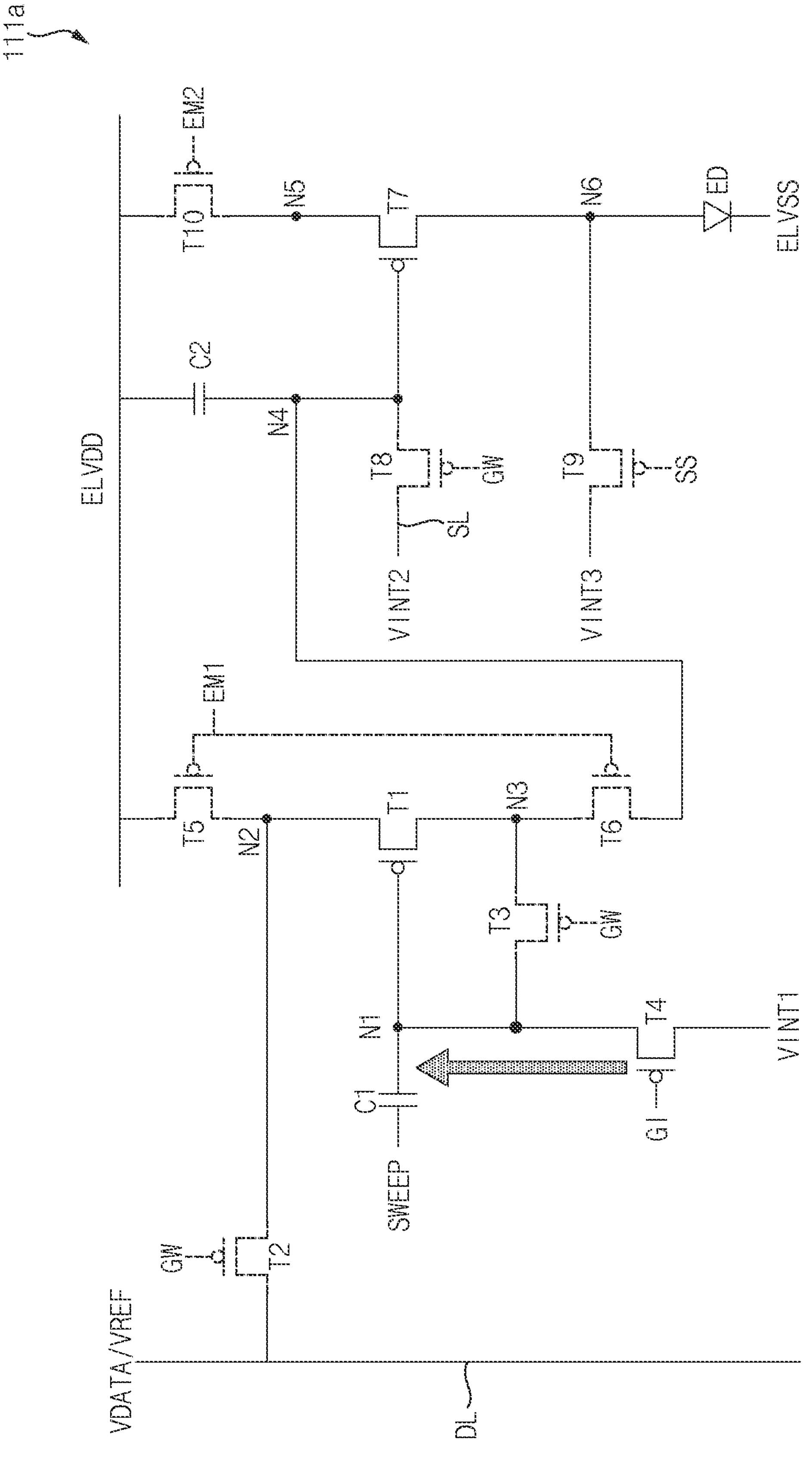
FIGS. 2C to 2E are each a schematic diagram of an equivalent circuit of the pixel circuit for illustrating an operation of the pixel circuit of FIG. 2A according to a timing operation of FIG. 2B.
Figure 2D:
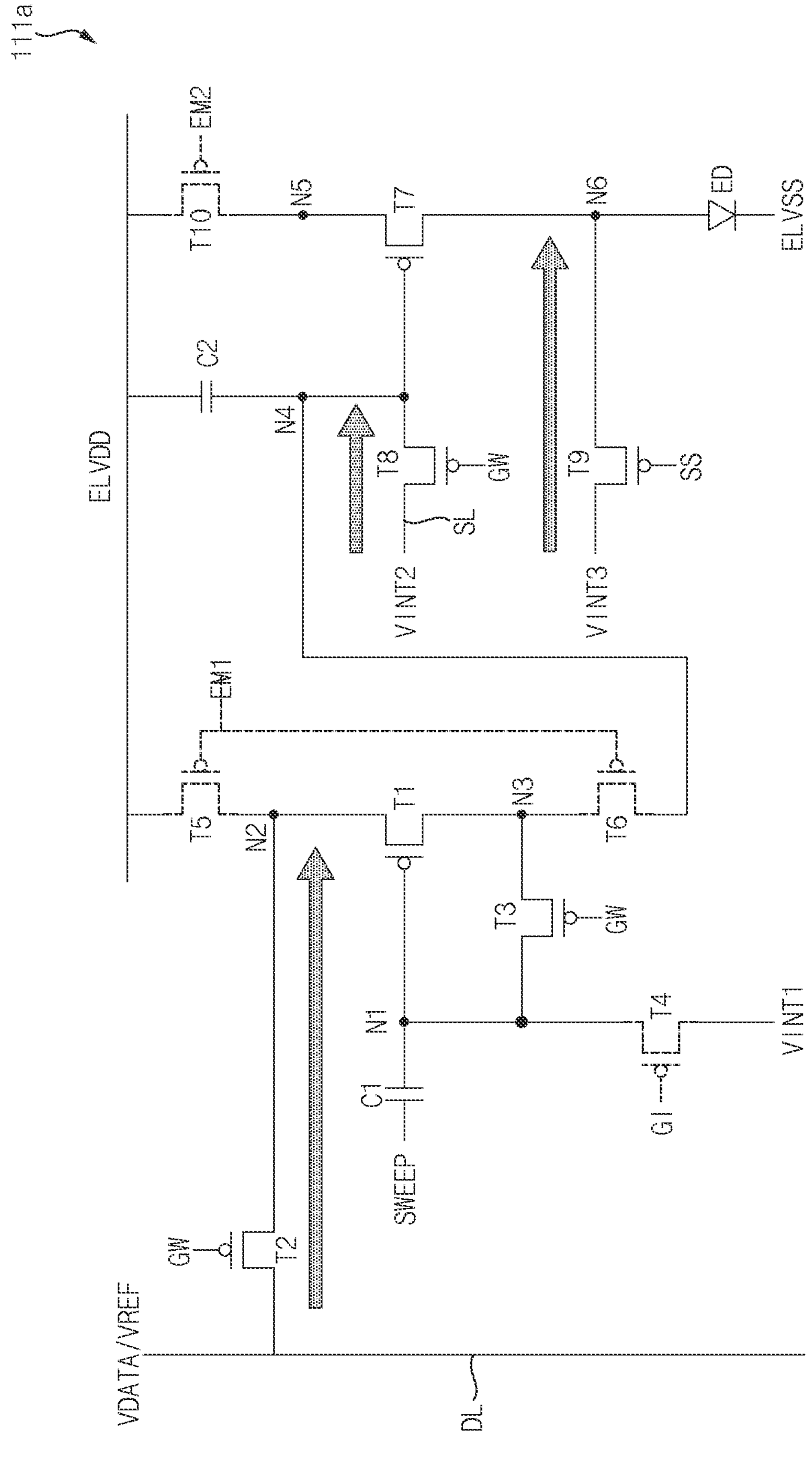
Figure 2E:
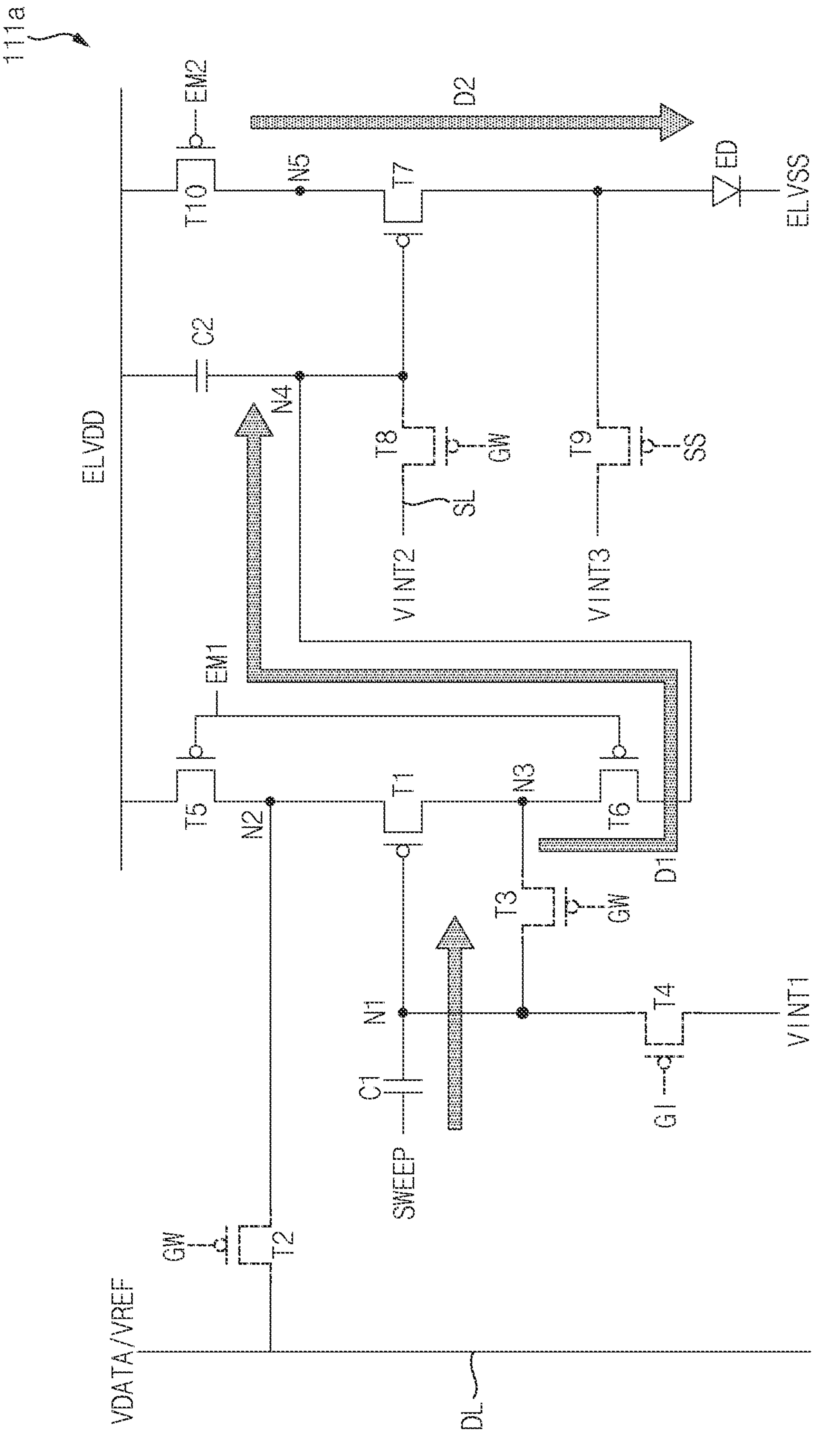

FIG. 2A is a schematic diagram of an equivalent circuit of a pixel circuit included in a display device of FIG. 1 according to an embodiment. FIG. 2B is a schematic timing diagram for illustrating first to third gate signals, a first emission signal, a second emission signal, and a sweep voltage, which are applied to a pixel circuit of FIG. 2A. FIGS. 2C to 2E are each a schematic diagram of an equivalent circuit of the pixel circuit for illustrating an operation of the pixel circuit of FIG. 2A according to a timing operation of FIG. 2B.

Referring to FIGS. 1 to 2E, a display panel 100 may include a pixel circuit 111*a*, and the pixel circuit 111*a* may include a light emitting element ED.

The pixel circuit 111*a* may receive a first gate signal GW, a second gate signal GI, a third gate signal SS, a data voltage VDATA, a first emission signal EM1, and a second emission signal EM2, and may display an image by emitting light from the light emitting element ED according to a level of a data voltage VDATA.

The pixel circuit 111*a* may include a light emitting element ED, a write transistor T2, a first driving transistor T1, a compensation transistor T3, a second driving transistor T7, a first initialization transistor T4, a second initialization transistor T8, a sensing transistor T9, a first capacitor C1, and a second capacitor C2.

The write transistor T2 may apply the data voltage VDATA to a first electrode (i.e., a second node N2) of the first driving transistor T1 in response to the first gate signal GW. The first driving transistor T1 may transmit a first driving current D1 to a gate electrode (i.e., a fourth node N4) of the second driving transistor T7. The first driving current D1 may be determined based on the data voltage VDATA. The compensation transistor T3 may diode-connect the first driving transistor T1 in response to the first gate signal GW. The second driving transistor T7 may transmit a second driving current D2 to the light emitting element ED. The second driving current D2 may be determined based on the first driving current D1. The first initialization transistor T4 may apply a first initialization voltage VINT1 to the gate electrode of the first driving transistor T1 in response to the second gate signal GI. The second initialization transistor T8 may apply a second initialization voltage VINT2 to the gate electrode of the second driving transistor T7 in response to the first gate signal GW. The sensing transistor T9 may receive the second driving current D2 in response to the third gate signal SS. The first capacitor C1 may include the first electrode receiving a sweep voltage SWEEP and the second electrode (i.e., a first node N1) connected to the gate electrode of the first driving transistor T1. The second capacitor C2 may include the first electrode receiving a first power voltage ELVDD and the second electrode (i.e., the fourth node N4) connected to the gate electrode of the second driving transistor T7.

The pixel circuit 111*a* may further include a first emission transistor T5 which applies the first power voltage ELVDD to the first electrode of the first driving transistor T1 in response to a first emission signal EM1, and a second emission transistor T6 which connects the first driving transistor T1 and the second driving transistor T7 in response to the first emission signal EM1.

The pixel circuit 111*a* may further include a third emission transistor T10 which applies the first power voltage ELVDD to the first electrode of the second driving transistor T7 in response to a second emission signal EM2.

For example, the pixel circuit 111*a* may include the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, and the third emission transistor T10, the first capacitor C1, the second capacitor C2, and the light emitting element ED.

The first driving transistor T1 may include the gate electrode connected to the first node N1, the first electrode connected to the second node N2, and the second electrode connected to the third node N3.

The write transistor T2 may include the gate electrode to which the first gate signal GW is applied, the first electrode to which the data voltage VDATA is applied, and the second electrode connected to the second node N2.

The compensation transistor T3 may include the gate electrode to which the first gate signal GW is applied, the first electrode connected to the first node N1, and the second electrode connected to the third node N3.

The first initiation transistor T4 may include the gate electrode to which the second gate signal GI is applied, the first electrode to which the first initiation voltage VINT1 is applied, and the second electrode connected to the first node N1.

The first emission transistor T5 may include the gate electrode to which the first emission signal EM1 is applied, the first electrode to which the first power voltage ELVDD is applied, and the second electrode connected to the second node N2.

The second emission transistor T6 may include the gate electrode to which the first emission signal EM1 is applied, the first electrode connected to the third node N3, and the second electrode connected to the fourth node N4.

The second driving transistor T7 may include the gate electrode connected to the fourth node N4, the first electrode connected to the fifth node N5, and the second electrode connected to the sixth node N6.

The second initiation transistor T8 may include the gate electrode to which the first gate signal GW is applied, the first electrode to which the second initiation voltage VINT2 is applied, and the second electrode connected to the fourth node N4.

The sensing transistor T9 may include the gate electrode to which the third gate signal SS is applied, the first electrode to which the third initiation voltage VINT3 is applied, and the second electrode connected to the sixth node N6.

The third emission transistor T10 may include the gate electrode to which the second emission signal EM2 is applied, the first electrode to which the first power voltage ELVDD is applied, and the second electrode connected to the fifth node N5.

The compensation transistor T3, the first initiation transistor T4, and the second driving transistor T7 may be of a same type.

For example, the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, and the third emission transistor T10 may be a P-type transistor. The first electrode of the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, and the third emission transistor T10 may be a source electrode. The second electrode of the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, and the third emission transistor T10 may be a drain electrode. The source electrode and the drain electrode may be called interchangeably.

The light emitting element ED may include an anode electrode connected to the sixth node N6 and a cathode electrode to which a second power voltage ELVSS is applied.

The first capacitor C1 may include the first electrode to which the sweep voltage SWEEP is applied and the second electrode connected to the first node N1.

The second capacitor C2 may include the first electrode to which the first power voltage ELVDD is applied and the second electrode connected to the fourth node N4.

As shown in FIG. 2B, a frame duration for the pixel P may include a first duration DU1, a second duration DU2, and a third duration DU3.

During the first duration DU1, the second gate signal GI may be at an active level. During the first duration DU1, the first gate signal GW, the third gate signal SS, the first emission signal EM1, and the second emission signal EM2 may be at an inactive level. During the first duration DU1, the first initialization transistor T4 may turn on. In case that the first initialization transistor T4 turns on, the first initialization voltage VINT1 may be applied to the first node N1. In case that the first initialization voltage VINT1 is applied to the first node N1, the gate electrode of the first driving transistor T1 may be initialized.

During the second duration DU2, the first gate signal GW and the third gate signal SS may be at an active level. During the second duration DU2, the second gate signal GI, the first emission signal EM1, and the second emission signal EM2 may be at an inactive level. During the second duration DU2, the write transistor T2, the compensation transistor T3, the second initiation transistor T8, and the sensing transistor T9 may turn on. In case that the write transistor T2 turns on, the data voltage VDATA may be applied to the second node N2. In case that the compensation transistor T3 turns on, the first driving transistor T1 may be diode-connected. In case that the first driving transistor T1 is diode-connected, a threshold voltage of the first driving transistor T1 may be compensated. In case that the second initialization transistor T8 turns on, the second initialization voltage VINT2 may be applied to the fourth node N4. In case that the second initialization voltage VINT2 is applied to the fourth node N4, the gate electrode of the second driving transistor T7 may be initialized. In case that the sensing transistor T9 turns on, the third initialization voltage VINT3 may be applied to the sixth node N6. In case that the third initialization voltage VINT3 is applied to the sixth node N6, the anode electrode of the light emitting element ED may be initialized.

During the third duration DU3, the first emission signal EM1 and the second emission signal EM2 may be at an active level. During the third duration DU3, the first gate signal GW, the second gate signal GI, and the third gate signal SS may be at an inactive level. During the third duration DU3, the sweep voltage SWEEP may have a waveform which gradually decreases to be at an inactive level. In case that the first emission transistor T5 and the second emission transistor T6 turn on, the first driving current D1 may flow from the first driving transistor T1 to the fourth node N4. The second driving transistor T7 may transmit the second driving current D2 to the light emitting element ED. The second driving current D2 may be determined based on the first driving current D1. The light emitting element ED may emit light based on the second driving current D2. In case that the sweep voltage SWEEP is at an inactive level, the first driving transistor T1 may operate as a switching transistor. In case that the sweep voltage SWEEP is at an inactive level, the first driving transistor T1 may apply the first power voltage ELVDD to the gate electrode (i.e., the fourth node N4) of the second driving transistor T7. In case that the first driving transistor T1 applies the first power voltage ELVDD to the gate electrode of the second driving transistor T7, the second driving transistor T7 may turn off. The second driving transistor T7 may turn on or off, and thus the emission time of the light emitting element ED may be adjusted.

Although not shown in FIG. 2B, a data driver 500 may apply a reference voltage VREF to the pixel circuit 111*a*, the second driving current D2 may be generated based on the reference voltage VREF, the sensing transistor T9 may receive the second driving current D2, and the data driver 500 may receive the second driving current D2 through a sensing line SL. The data driver 500 may generate sensing data SD based on the second driving current D2. The data driver 500 may output the sensing data SD to the driving controller 200. The driving controller 200 may determine a threshold voltage, mobility, and the like of the first driving transistor T1 and the second driving transistor T7 based on the sensing data SD. The driving controller 200 may compensate input image data IMG based on the sensing data SD. The data driver 500 may generate the data voltage VDATA corresponding to the compensated input image data IMG, and may output the data voltage VDATA corresponding to the compensated input image data IMG to a data line DL.

As described above, the threshold voltage of the first driving transistor T1 may be compensated by using an internal compensation circuit, the second driving current D2 of the second driving transistor T7 may be received through the sensing transistor T9 by using an external compensation circuit, and the threshold voltage and mobility of the first and second driving transistors T1 and T7 may be compensated. Accordingly, display quality may be enhanced.

Figure 3A:
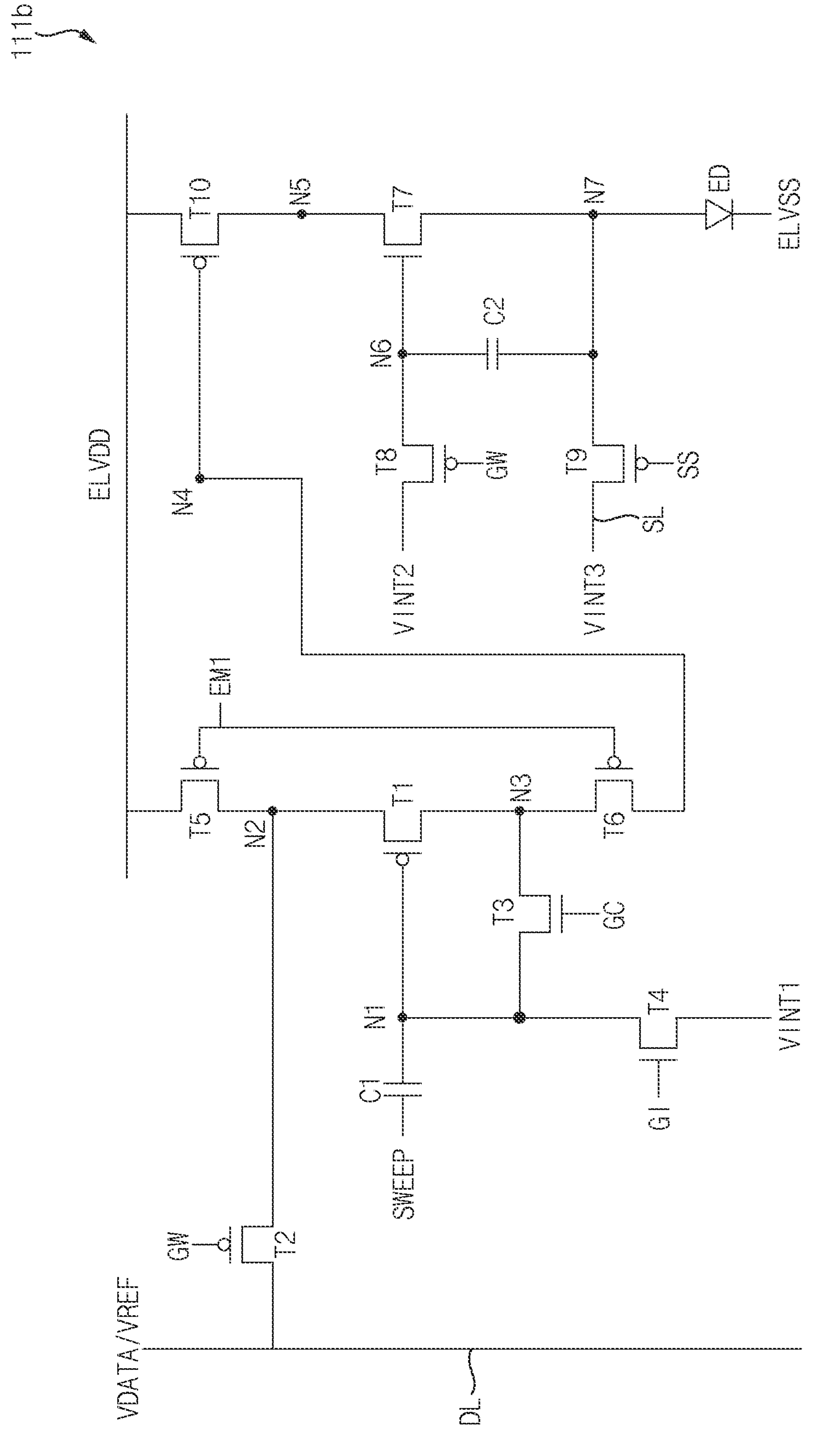
FIG. 3A is a schematic diagram of an equivalent circuit of the pixel circuit included in the display device of FIG. 1 according to an embodiment of the disclosure.
Figure 3B:
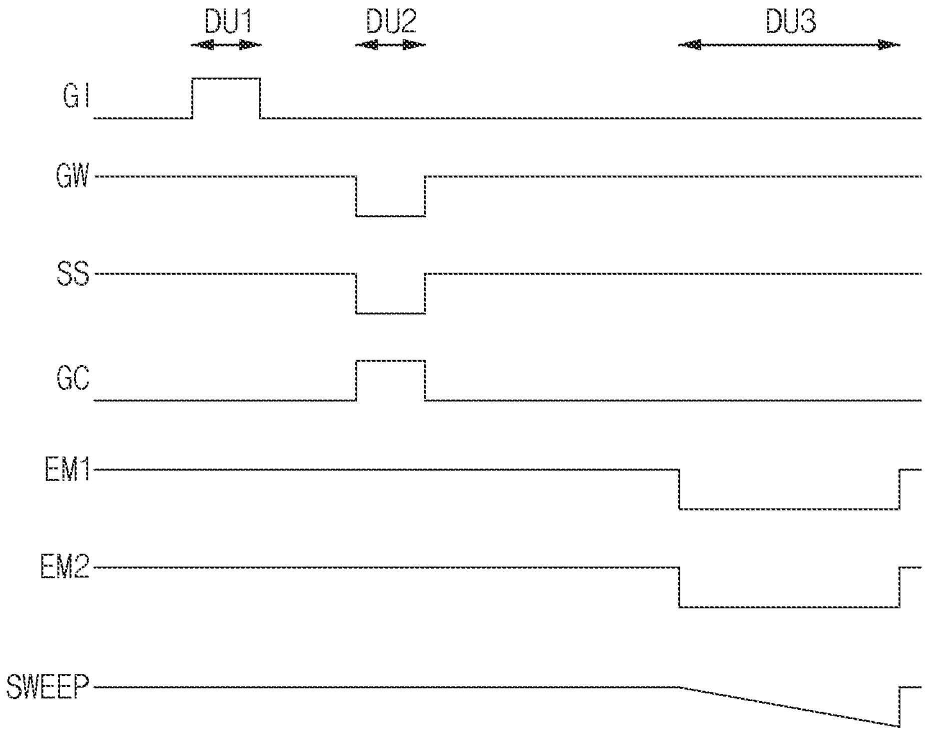
FIG. 3B is a schematic timing diagram for illustrating first to fourth gate signals, the first emission signal, the second emission signal, and the sweep voltage, which are applied to the pixel circuit of FIG. 3A.
Figure 3C:
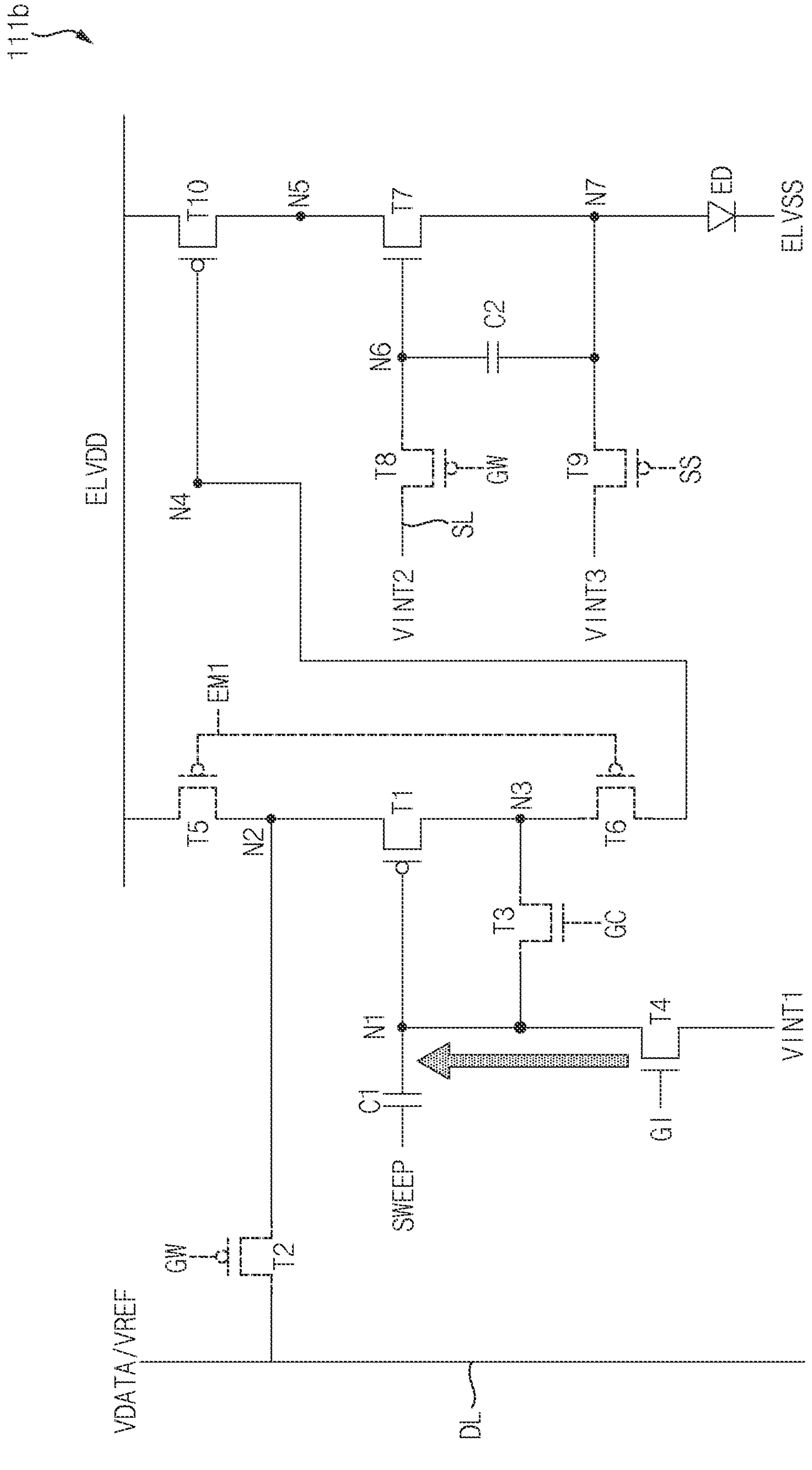
FIGS. 3C to 3E are each a schematic diagram of an equivalent circuit of the pixel circuit for illustrating an operation of the pixel circuit of FIG. 3A according to a timing operation of FIG. 3B.
Figure 3D:
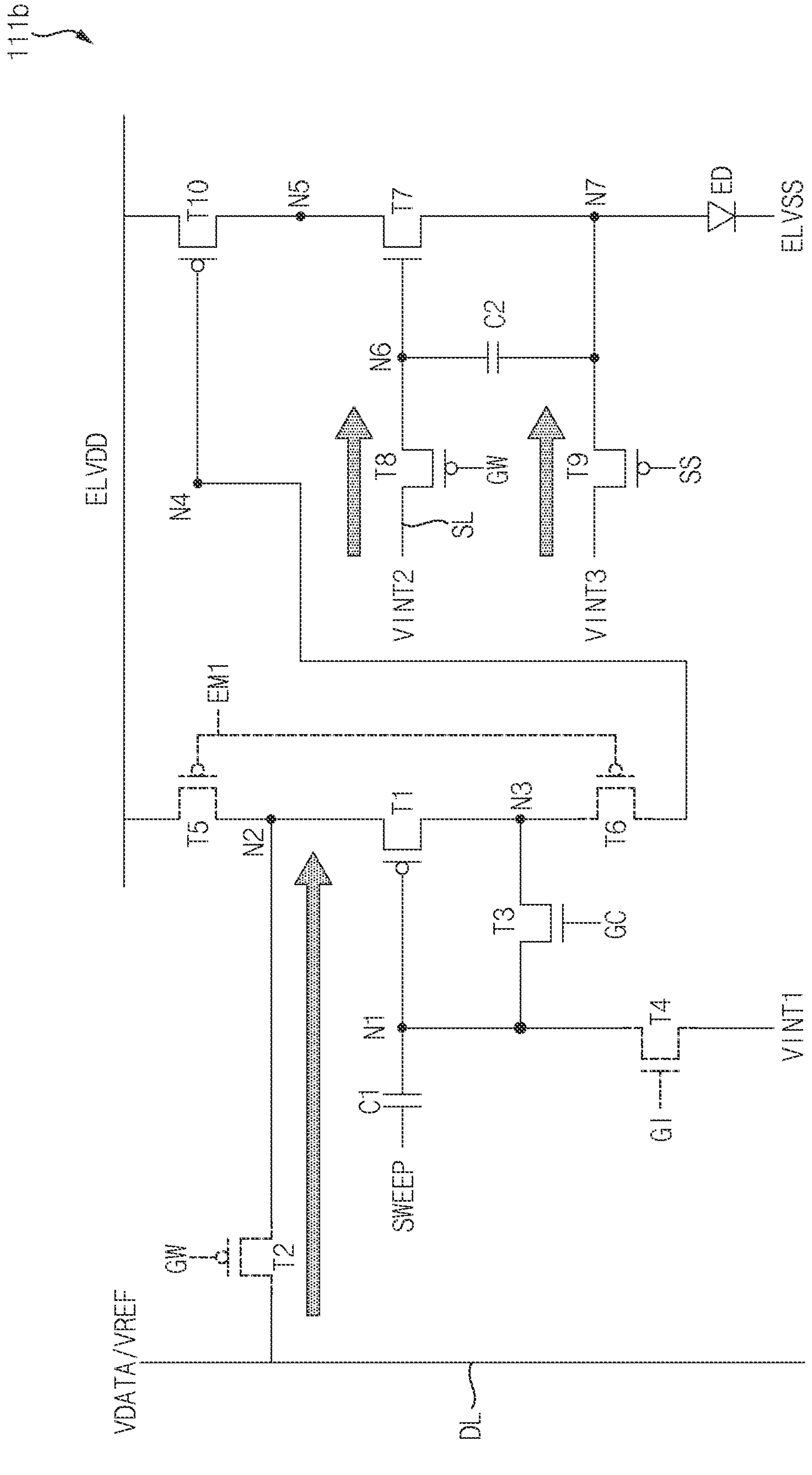
Figure 3E:
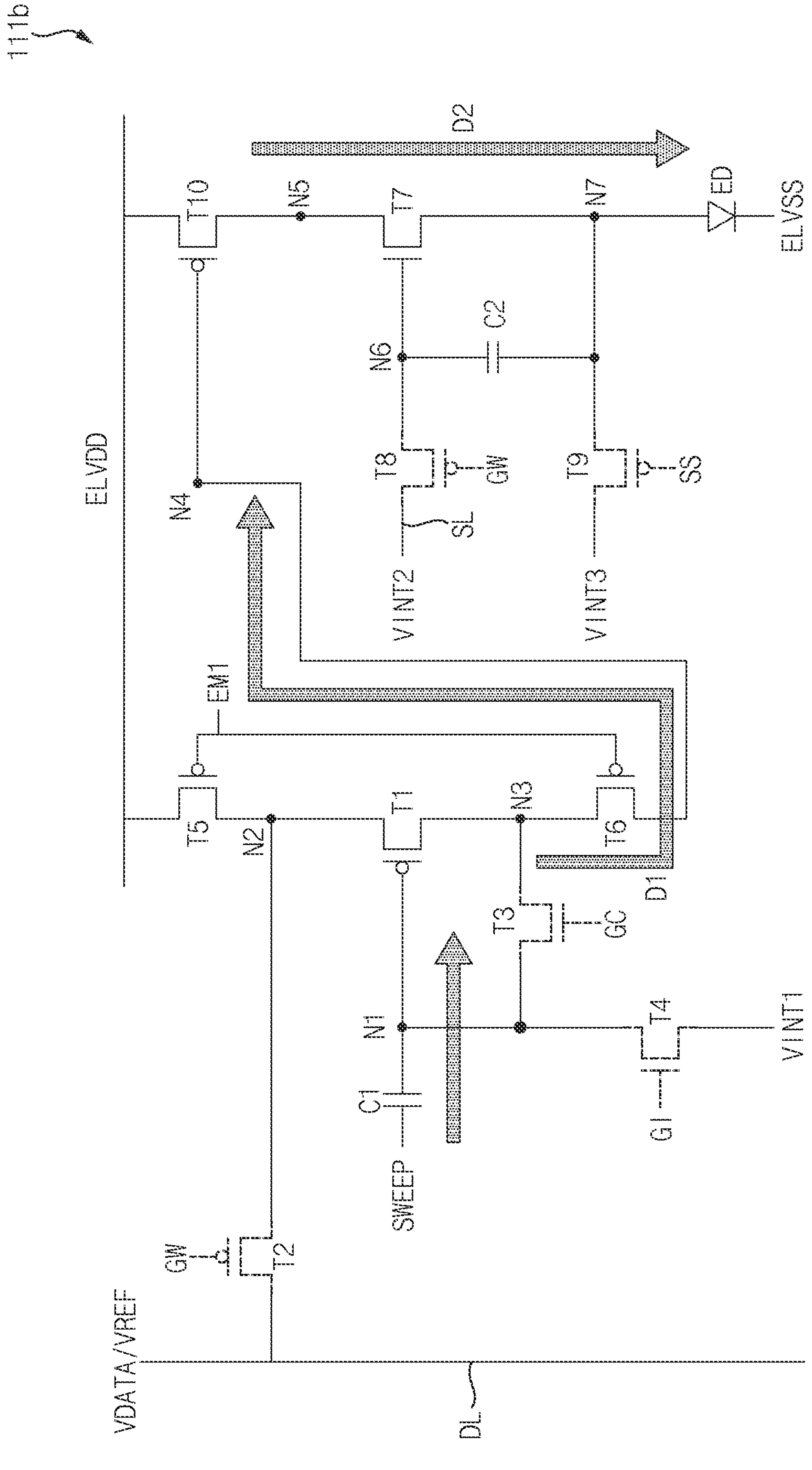

FIG. 3A is a schematic diagram of an equivalent circuit of the pixel circuit included in the display device of FIG. 1 according to an embodiment of the disclosure. FIG. 3B is a schematic timing diagram for illustrating first to fourth gate signals, the first emission signal, the second emission signal, and the sweep voltage, which are applied to the pixel circuit of FIG. 3A. FIGS. 3C to 3E are each a schematic diagram of an equivalent circuit of the pixel circuit for illustrating an operation of the pixel circuit of FIG. 3A according to a timing operation of FIG. 3B.

Referring to FIGS. 1 and 3A to 3E, the display panel 100 may include a pixel circuit 111*b*, and the pixel circuit 111*b* may include a light emitting element ED.

The pixel circuit 111*b* may receive the first gate signal GW, the second gate signal GI, the third gate signal SS, the fourth gate signal GC, the data voltage VDATA, the first emission signal EM1, and the second emission signal EM2, and may display an image by emitting light from the light emitting element ED according to a level of a data voltage VDATA.

The pixel circuit 111*b* may include the light emitting element ED, the write transistor T2, the first driving transistor T1, the compensation transistor T3, the second driving transistor T7, the first initialization transistor T4, the second initialization transistor T8, the sensing transistor T9, the first capacitor C1, and the second capacitor C2.

The write transistor T2 may apply the data voltage VDATA to a first electrode (i.e., the second node N2) of the first driving transistor T1 in response to the first gate signal GW.

The first driving transistor T1 may apply the first driving current D1 to the gate electrode (i.e., the fourth node N4) of the third emission transistor T10. The first driving current D1 may be determined based on the data voltage VDATA. The compensation transistor T3 may diode-connect the first driving transistor T1 in response to the fourth gate signal GC. The first initialization transistor T4 may apply the first initialization voltage VINT1 to the gate electrode of the first driving transistor T1 in response to the second gate signal GI. The second initialization transistor T8 may apply the second initialization voltage VINT2 to the gate electrode (i.e., the sixth node N6) of the second driving transistor T7 in response to the first gate signal GW. The second driving transistor T7 may apply the second driving current D2 to the anode electrode of the light emitting element ED. The second driving current D2 may be determined based on a voltage of the second electrode (i.e., the sixth node N6) of the second initiation transistor T8. The sensing transistor T9 may receive the second driving current D2 in response to the third gate signal SS. The first capacitor C1 may include the first electrode receiving the sweep voltage SWEEP and the second electrode (i.e., the first node N1) connected to the gate electrode of the first driving transistor T1. The second capacitor C2 may include the first electrode (i.e., the sixth node N6) connected to the gate electrode of the second driving transistor T7 and the second electrode (i.e., the seventh node N7) connected to the second electrode of the second driving transistor T7.

The pixel circuit 111*b* may further include the first emission transistor T5 which applies the first power voltage ELVDD to the first electrode of the first driving transistor T1 in response to the first emission signal EM1, and the second emission transistor T6 which connects the first driving transistor T1 and the second driving transistor T7 in response to the first emission signal EM1.

For example, the pixel circuit 111*b* may include the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, the third emission transistor T10, the first capacitor C1, the second capacitor C2, and the light emitting element ED.

The first driving transistor T1 may include the gate electrode connected to the first node N1, the first electrode connected to the second node N2, and the second electrode connected to the third node N3.

The write transistor T2 may include the gate electrode to which the first gate signal GW is applied, the first electrode to which the data voltage VDATA is applied, and the second electrode connected to the second node N2.

The compensation transistor T3 may include the gate electrode to which the fourth gate signal GC is applied, the first electrode connected to the first node N1, and the second electrode connected to the third node N3.

The first initiation transistor T4 may include the gate electrode to which the second gate signal GI is applied, the first electrode to which the first initiation voltage VINT1 is applied, and the second electrode connected to the first node N1.

The first emission transistor T5 may include the gate electrode to which the first emission signal EM1 is applied, the first electrode to which the first power voltage ELVDD is applied, and the second electrode connected to the second node N2.

The second emission transistor T6 may include the gate electrode to which the first emission signal EM1 is applied, the first electrode connected to the third node N3, and the second electrode connected to the fourth node N4.

The second driving transistor T7 may include the gate electrode connected to the sixth node N6, the first electrode connected to the fifth node N5, and the second electrode connected to the seventh node N7.

The second initiation transistor T8 may include the gate electrode to which the first gate signal GW is applied, the first electrode to which the second initiation voltage VINT2 is applied, and the second electrode connected to the sixth node N6.

The sensing transistor T9 may include the gate electrode to which the third gate signal SS is applied, the first electrode to which the third initiation voltage VINT3 is applied, and the second electrode connected to the seventh node N7.

The third emission transistor T10 may include the gate electrode to which the second emission signal EM2 is applied, the first electrode to which the first power voltage ELVDD is applied, and the second electrode connected to the fifth node N5.

The compensation transistor T3, the first initiation transistor T4, and the second driving transistor T7 may be of a same type.

For example, the first driving transistor T1, the write transistor T2, the first emission transistor T5, the second emission transistor T6, the second initialization transistor T8, the sensing transistor T9, and the third emission transistor T10 may be a P-type transistor. For example, the compensation transistor T3, the first initiation transistor T4, and the second driving transistor T7 may be an N-type transistor. The first electrode of the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, and the third emission transistor T10 may be a source electrode. The second electrode of the first driving transistor T1, the write transistor T2, the compensation transistor T3, the first initialization transistor T4, the first emission transistor T5, the second emission transistor T6, the second driving transistor T7, the second initialization transistor T8, the sensing transistor T9, and the third emission transistor T10 may be a drain electrode. The source electrode and the drain electrode may be called interchangeably.

The light emitting element ED may include the anode electrode connected to the seventh node N7 and the cathode electrode to which the second power voltage ELVSS is applied.

The first capacitor C1 may include the first electrode to which the sweep voltage SWEEP is applied and the second electrode connected to the first node N1.

The second capacitor C2 may include the first electrode connected to the sixth node N6 and the second electrode connected to the seventh node N7.

As shown in FIG. 3B, a frame duration for the pixel P may include the first duration DU1, the second duration DU2, and the third duration DU3.

During the first duration DU1, the second gate signal GI may be at an active level. During the first duration DU1, the first gate signal GW, the third gate signal SS, the fourth gate signal GC, the first emission signal EM1, and the second emission signal EM2 may be at an inactive level. During the first duration DU1, the first initialization transistor T4 may turn on. In case that the first initialization transistor T4 turns on, the first initialization voltage VINT1 may be applied to the first node N1. In case that the first initialization voltage VINT1 is applied to the first node N1, the gate electrode of the first driving transistor T1 may be initialized.

During the second duration DU2, the first gate signal GW, the third gate signal SS, and the fourth gate signal GC may be at an active level. During the second duration DU2, the second gate signal GI, the first emission signal EM1, and the second emission signal EM2 may be at an inactive level. During the second duration DU2, the write transistor T2, the compensation transistor T3, the second initiation transistor T8, and the sensing transistor T9 may turn on. In case that the write transistor T2 turns on, the data voltage VDATA may be applied to the second node N2. In case that the compensation transistor T3 turns on, the first driving transistor T1 may be diode-connected. In case that the first driving transistor T1 is diode-connected, a threshold voltage of the first driving transistor T1 may be compensated. In case that the second initialization transistor T8 turns on, the second initialization voltage VINT2 may be applied to the sixth node N6. In case that the sensing transistor T9 turns on, the third initialization voltage VINT3 may be applied to the seventh node N7. In case that the third initialization voltage VINT3 is applied to the seventh node N7, the anode electrode of the light emitting element ED may be initialized.

During the third duration DU3, the first emission signal EM1 and the second emission signal EM2 may be at an active level. During the third duration DU3, the first gate signal GW, the second gate signal GI, the third gate signal SS, and the fourth gate signal GC may be at an inactive level. During the third duration DU3, the sweep voltage SWEEP may have a waveform which gradually decreases to be at an inactive level. In case that the first emission transistor T5 and the second emission transistor T6 turn on, the first driving current D1 may flow from the first driving transistor T1 to the fourth node N4. The second driving transistor T7 may transmit the second driving current D2 to the light emitting element ED. The second driving current D2 may be determined based on the first driving current D1. The light emitting element ED may emit light based on the second driving current D2. In case that the sweep voltage SWEEP is at an inactive level, the first driving transistor T1 may operate as a switching transistor. In case that the sweep voltage SWEEP is at an inactive level, the first driving transistor T1 may apply the first power voltage ELVDD to the gate electrode (i.e., the fourth node N4) of the third emission transistor T10. In case that the first driving transistor T1 applies the first power voltage ELVDD to the gate electrode of the third emission transistor T10, the third emission transistor T10 may turn off. The third emission transistor T10 may turn on or off, and thus the emission time of the light emitting element ED may be adjusted.

Although not shown in FIG. 3B, the data driver 500 may apply the reference voltage VREF to the pixel circuit 111*b*, the second driving current D2 may be generated based on the reference voltage VREF, the sensing transistor T9 may receive the second driving current D2, and the data driver 500 may receive the second driving current D2 through the sensing line SL. The data driver 500 may generate the sensing data SD based on the second driving current D2. The data driver 500 may output the sensing data SD to the driving controller 200. The driving controller 200 may determine the threshold voltage, mobility, and the like of the first driving transistor T1 and the second driving transistor T7 based on the sensing data SD. The driving controller 200 may compensate input image data IMG based on the sensing data SD. The data driver 500 may generate the data voltage VDATA corresponding to the compensated input image data IMG, and may output the data voltage VDATA corresponding to the compensated input image data IMG to the data line DL.

As described above, the threshold voltage of the first driving transistor T1 may be compensated by using the internal compensation circuit, the second driving current D2 of the second driving transistor T7 may be received through the sensing transistor T9 by using the external compensation circuit, and the threshold voltage and mobility of the first and second driving transistors T1 and T7 may be compensated. Accordingly, display quality may be enhanced.

Figure 4:
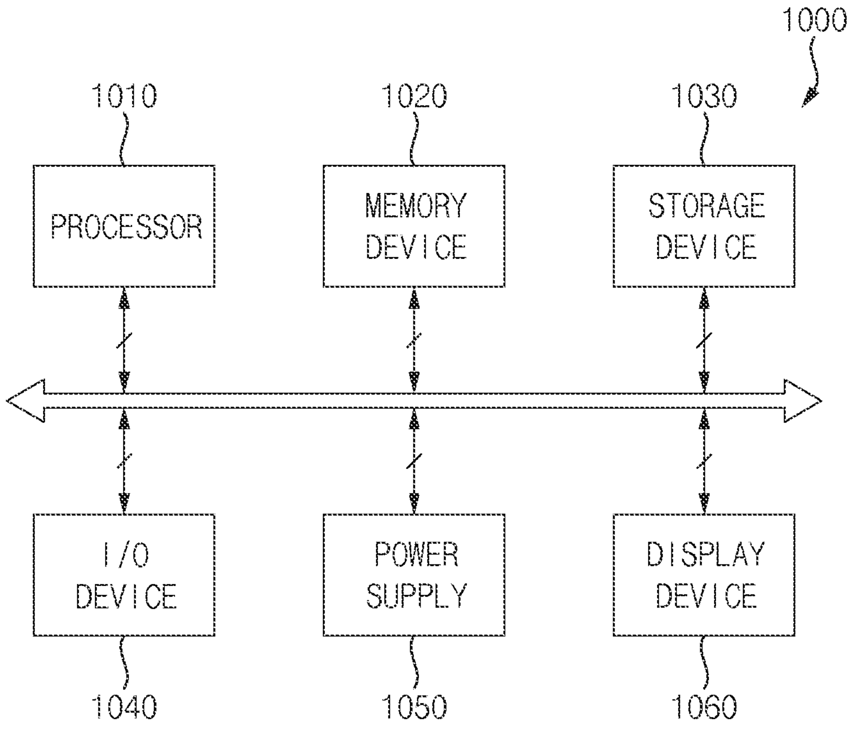
FIG. 4 is a schematic block diagram of an electronic device.
Figure 5:
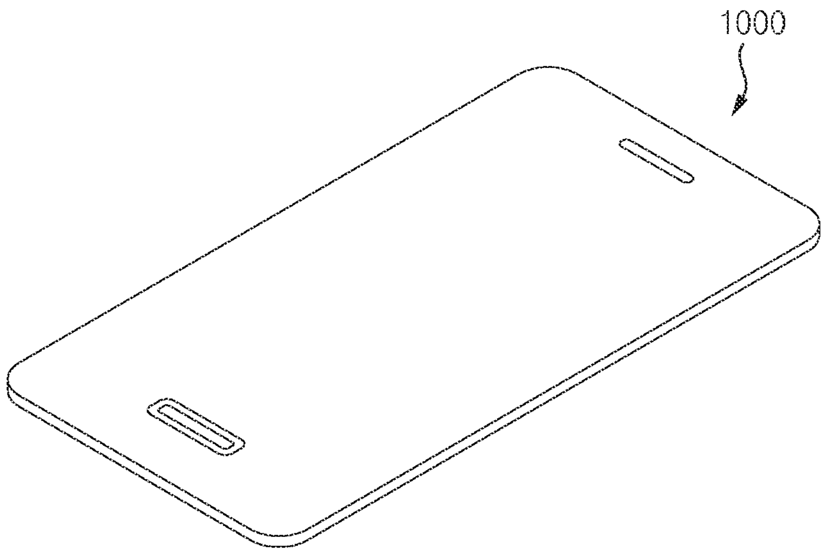
FIG. 5 is a schematic diagram for illustrating an embodiment in which the electronic device of FIG. 4 is implemented as a smart phone.

FIG. 4 is a schematic block diagram of an electronic device. FIG. 5 is a schematic diagram for illustrating an embodiment in which the electronic device of FIG. 4 is implemented as a smart phone.

Referring to FIGS. 4 and 5, an electronic device 1000 may include a processor 1010, a memory device 1020, a storage device 1030, an input/output (I/O) device 1040, a power supply 1050, and a display device 1060. The display device 1060 may be a display device 10 in FIG. 1. The electronic device 1000 may further include multiple ports for communicating with a video card, a sound card, a memory card, a universal serial bus (USB) device, another electronic device, or the like.

In an embodiment, as illustrated in FIG. 5, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, or the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may be a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The disclosure may be applied to any display device and any electronic device including the touch panel. For example, the disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are the scope of the disclosure.

What is claimed is:

1. A pixel circuit comprising:

a light emitting element;

a write transistor that applies a data voltage to a first electrode of a first driving transistor in response to a first gate signal;

the first driving transistor that transmits a first driving current determined based on the data voltage to a gate electrode of a second driving transistor;

a compensation transistor that diode-connects the first driving transistor in response to the first gate signal;

the second driving transistor that transmits a second driving current determined based on the first driving current to the light emitting element;

a first initialization transistor that applies a first initialization voltage to a gate electrode of the first driving transistor in response to a second gate signal;

a second initialization transistor that applies a second initialization voltage to the gate electrode of the second driving transistor in response to the first gate signal;

a sensing transistor that receives the second driving current in response to a third gate signal;

a first capacitor including a first electrode receiving a sweep voltage and a second electrode connected to the gate electrode of the first driving transistor; and a second capacitor including a first electrode receiving a first power voltage and a second electrode connected to the gate electrode of the second driving transistor.

2. The pixel circuit of claim 1, wherein the sweep voltage has a waveform which gradually decreases to be at an inactive level, and the first driving transistor applies the first power voltage to the gate electrode of the second driving transistor in case that the sweep voltage is at the inactive level.

3. The pixel circuit of claim 2, wherein the second driving transistor turns off in case that the first driving transistor applies the first power voltage to the gate electrode of the second driving transistor.

4. The pixel circuit of claim 1, wherein the sensing transistor applies a third initialization voltage to an anode electrode of the light emitting element in response to the third gate signal.

5. The pixel circuit of claim 1, further comprising:

a first emission transistor that applies the first power voltage to the first electrode of the first driving transistor in response to a first emission signal; and a second emission transistor that connects the first driving transistor and the second driving transistor in response to the first emission signal.

6. The pixel circuit of claim 1, further comprising:

a third emission transistor that applies the first power voltage to a first electrode of the second driving transistor in response to a second emission signal.

7. The pixel circuit of claim 1, wherein the compensation transistor, the first initialization transistor, and the second driving transistor are of a same type.

8. The pixel circuit of claim 7, wherein the compensation transistor, the first initialization transistor, and the second driving transistor are a P-type transistor.

9. A pixel circuit comprising:
a light emitting element;
a write transistor that applies a data voltage to a first electrode of a first driving transistor in response to a first gate signal;
the first driving transistor that transmits a first driving current determined based on the data voltage to a gate electrode of a third emission transistor;
a compensation transistor that diode-connects the first driving transistor in response to a fourth gate signal;
a first initialization transistor that applies a first initialization voltage to a gate electrode of the first driving transistor in response to a second gate signal;
a second initialization transistor that applies a second initialization voltage to the gate electrode of a second driving transistor in response to the first gate signal;
the second driving transistor that transmits a second driving current determined based on a voltage of a second electrode of the second initialization transistor to the light emitting element;
a sensing transistor that receives the second driving current in response to a third gate signal;
a first capacitor including a first electrode receiving a sweep voltage and a second electrode connected to the gate electrode of the first driving transistor; and
a second capacitor including a first electrode connected to the gate electrode of the second driving transistor and a second electrode connected to a second electrode of the second driving transistor.

10. The pixel circuit of claim 9, wherein
the sweep voltage has a waveform which gradually decreases to be at an inactive level, and
the first driving transistor applies a first power voltage to the gate electrode of the third emission transistor in case that the sweep voltage is at the inactive level.

11. The pixel circuit of claim 10, wherein the third emission transistor turns off in case that the first driving transistor applies the first power voltage to the gate electrode of the third emission transistor.

12. The pixel circuit of claim 9, wherein the sensing transistor applies a third initialization voltage to an anode electrode of the light emitting element in response to the third gate signal.

13. The pixel circuit of claim 9, further comprising:
a first emission transistor that applies a first power voltage to the first electrode of the first driving transistor in response to a first emission signal; and
a second emission transistor that connects the first driving transistor and the second driving transistor in response to the first emission signal.

14. The pixel circuit of claim 9, wherein the compensation transistor, the first initialization transistor, and the second driving transistor are of a same type.

15. The pixel circuit of claim 14, wherein the compensation transistor, the first initialization transistor, and the second driving transistor are an N-type transistor.

16. A display device comprising:
a display panel including a pixel circuit; and
a display panel driver that drives the display panel, wherein the pixel circuit comprises:
a light emitting element;
a write transistor that applies a data voltage to a first electrode of a first driving transistor in response to a first gate signal;
the first driving transistor that transmits a first driving current determined based on the data voltage to a gate electrode of a second driving transistor;
a compensation transistor that diode-connects the first driving transistor in response to the first gate signal;
the second driving transistor that transmits a second driving current determined based on the first driving current to the light emitting element;
a first initialization transistor that applies a first initialization voltage to a gate electrode of the first driving transistor in response to a second gate signal;
a second initialization transistor that applies a second initialization voltage to the gate electrode of the second driving transistor in response to the first gate signal;
a sensing transistor that receives the second driving current in response to a third gate signal;
a first capacitor including a first electrode receiving a sweep voltage and a second electrode connected to the gate electrode of the first driving transistor; and
a second capacitor including a first electrode receiving a first power voltage and a second electrode connected to the gate electrode of the second driving transistor.

17. The display device of claim 16, wherein
the sweep voltage has a waveform which gradually decreases to be at an inactive level, and
the first driving transistor applies the first power voltage to the gate electrode of the second driving transistor in case that the sweep voltage is at the inactive level.

18. The display device of claim 17, wherein the second driving transistor turns off in case that the first driving transistor applies the first power voltage to the gate electrode of the second driving transistor.

19. The display device of claim 16, wherein the sensing transistor applies a third initialization voltage to an anode electrode of the light emitting element in response to the third gate signal.

20. The display device of claim 16, wherein the pixel circuit further comprises:
a first emission transistor that applies the first power voltage to the first electrode of the first driving transistor in response to a first emission signal; and
a second emission transistor that connects the first driving transistor and the second driving transistor in response to the first emission signal.

21. An electronic device comprising:
a display panel including a pixel circuit;
a display panel driver that drives the display panel; and
a processor that controls the display panel driver, wherein the pixel circuit comprises:
a light emitting element;
a write transistor that applies a data voltage to a first electrode of a first driving transistor in response to a first gate signal;
the first driving transistor that transmits a first driving current determined based on the data voltage to a gate electrode of a second driving transistor;
a compensation transistor that diode-connects the first driving transistor in response to the first gate signal;
the second driving transistor that transmits a second driving current determined based on the first driving current to the light emitting element;
a first initialization transistor that applies a first initialization voltage to a gate electrode of the first driving transistor in response to a second gate signal;
a second initialization transistor that applies a second initialization voltage to the gate electrode of the second driving transistor in response to the first gate signal;

a sensing transistor that receives the second driving current in response to a third gate signal;

a first capacitor including a first electrode receiving a sweep voltage and a second electrode connected to the gate electrode of the first driving transistor; and a second capacitor including a first electrode receiving a first power voltage and a second electrode connected to the gate electrode of the second driving transistor.

* * * * *